(12) United States Patent
Tyan et al.

(10) Patent No.: US 6,224,960 B1
(45) Date of Patent: May 1, 2001

(54) PHASE-CHANGE RECORDING MEDIUM FOR WRITE ONCE APPLICATIONS

(75) Inventors: Yuan-Sheng Tyan; George R. Olin; Guiseppe Farruggia, all of Webster; Bruno Primerano, Walworth; Fridrich Vazan, Pittsford; Thomas R. Cushman, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/313,951

(22) Filed: May 18, 1999

(51) Int. Cl.[7] .................................................. B32B 3/00
(52) U.S. Cl. ...................... 428/64.2; 428/64.4; 428/64.5; 428/64.6; 428/913; 430/270.13; 430/495.1; 430/945; 369/283; 369/288
(58) Field of Search .................... 428/64.1, 64.2, 428/64.4, 64.5, 64.6, 913; 430/270.13, 495.1, 945; 369/283, 288

(56) References Cited

U.S. PATENT DOCUMENTS

| | | | | |
|---|---|---|---|---|
| 5,719,006 | * | 2/1998 | Ohkubo | 430/270.13 |
| 5,912,103 | * | 6/1999 | Ebina | 430/270.13 |
| 5,978,349 | * | 11/1999 | Yoshinari | 369/275.1 |
| 6,094,405 | * | 7/2000 | Ogawa | 369/14 |

* cited by examiner

Primary Examiner—Elizabeth Evans
(74) Attorney, Agent, or Firm—Raymond L. Owens

(57) ABSTRACT

A recording medium includes a transparent substrate; a crystalline phase-change layer provided over the transparent substrate; a dielectric layer provided over the phase-change layer; a metallic reflector layer provided over the dielectric layer; and the crystalline phase-change layer having a thickness and phase-change material selected so that data can be recorded in it on a first write, but on second or subsequent writes the written data results in at least a 50% increase in data jitter.

5 Claims, 5 Drawing Sheets

PHASE-CHANGE RECORDING MEDIUM FOR WRITE ONCE APPLICATIONS

FIELD OF THE INVENTION

The present invention relates to phase-change recording medium which is particularly suitable for write-once read-many times (WORM) applications.

BACKGROUND OF THE INVENTION

Optical recording has been increasingly used in recent years to publish, distribute, store, and retrieve digital information. This is done by focusing a laser beam to write and/or read information on an optical recording media usually in the form of a spinning disk. In the read only memory (ROM) format, the information is prefabricated at the factory in the form of encoded small features on the disk and the laser beam is used to read back the information. In the writable formats, the laser beam is used to create the small encoded marks through a variety of physical recording mechanisms. This permits the user to record their own data on the disk. Some recording physical mechanisms are reversible. The recorded marks can be erased and remade repeatedly. Disks that utilize these mechanisms are called Erasable or Re-writable disks. Some of these physical mechanisms are one way, once the marks are made they cannot be reversed or altered without leaving a clearly identifiable trace that can be detected. Disks that utilize these mechanisms are called WORM disks. Each of these formats is suitable for certain practical applications.

The present invention focuses on WORM disks. The popularity of compact disk recordable (CD-R), which is a WORM disk, in recent years suggests that the demand of WORM disks is very strong. This format is suitable for many applications where the data are to be stored in such a form that any modification to the content is not possible without leaving a easily detectable trace. The format is also suitable for many applications where rewriteability is not needed such as those for publishing and distribution. In these applications the WORM disks are desirable if they can be provided at lower costs than the rewritable.

Many physical mechanisms have been used for WORM recording. The first practical WORM disks utilized ablative recording where the pulsed laser beam is used to create physical pits in the recording layer. This mechanism requires the disks to be in an air-sandwiched structure to leave the surface of the recording layer free from any physical obstruction during the pit formation process. The other mechanism is to use the laser beam to cause the fusing or chemical interaction of several layers into a different layer. This mechanism suffers from the requirement of relatively high laser power and from the difficulty in manufacturing the multi-layered structure. The other mechanism is to use organic dye as the recording layer. Although used successfully in CD-R disks, this mechanism suffers from its strong wavelength dependence. The optical head used in the DVD devices operating at 650 nm, for example, is not able to read the CD-R disks designed to work at the CD wavelength of 780 nm. Yet another mechanism is to use phase-change recording media. In contrast to the more popular erasable phase-change media, these WORM media are designed to record data via laser crystallization of the as-deposited amorphous phase. The materials are designed such that it is practically impossible to reverse the laser crystallized state back into the amorphous state. Whereas this mechanism is able to minimize or eliminate most of the problems mentioned above, it is unique in its recording polarity. The crystalline recorded marks have higher reflectivity than the amorphous background, opposite to most other recording mechanisms. This makes it difficult to produce multifunction drive devices.

SUMMARY OF THE INVENTION

It is therefore an object of the present invention to provide improved WORM media that can avoid the above mentioned problems.

It is a further object to provide WORM media with an intrinsic low-cost structure so that those applications for which WORM functionality is not a necessity can benefit from having these media.

These object are achieved in a recording medium comprising:
 (a) a transparent substrate;
 (b) a crystalline phase-change layer provided over the transparent substrate;
 (c) a dielectric layer provided over the phase-change layer;
 (d) a metallic reflector layer provided over the dielectric layer; and
 (e) the crystalline phase-change layer having a thickness and phase-change material selected so that data can be recorded in it on a first write, but on second or subsequent writes the written data results in at least a 50% increase in data jitter.

Quite unexpectedly it has been discovered that if the disk structure and materials are properly chosen, a WORM disk can be fabricated using erasable phase-change materials. These materials can be cycled between the amorphous and crystalline phases and are normally used to produce rewritable disks. Specifically, it has been discovered that by choosing the phase-change material and disk structure that produce a detectable irreversible change during recording than any attempts to rewrite the data will still leave a detectable residue even if the recording layer itself is undergoing a completely reversible change. To qualify as a WORM media, however, the detectable residue has to be large enough so that it can be unmistakenly distinguished from other possible causes of data degradation. For one skilled in the art the data-to-clock jitter is a parameter normally used to describe the quality of the read-back data. For DVD-ROM disks, for example, the specification for the data-to-clock jitter is 8% of the detection timing window of 38.23 ns. If the data-to-clock jitter is degraded by 50% of this value to above 12%, the change can be easily detected.

The present invention is particularly suitable for providing a WORM recording medium using phase-change materials that can be cycled between the amorphous and the crystalline state by the application of a laser beam. The present invention is also suitable for providing the WORM media with physical and recording properties very similar to rewritable media so that it is easier to provide a multifunction read/write drives that can handle both types of media. The present invention also provides the WORM media with a simpler layer structure so that it is easier to manufacture and lower cost than the rewritable media. A feature of the present invention is the provision of the WORM media using the same materials as those used for a re-writable media so that the two types of media can share the same production equipment to reduce cost.

DETAILED DESCRIPTION OF THE PREFERRED EMBODIMENTS

Figure 1:
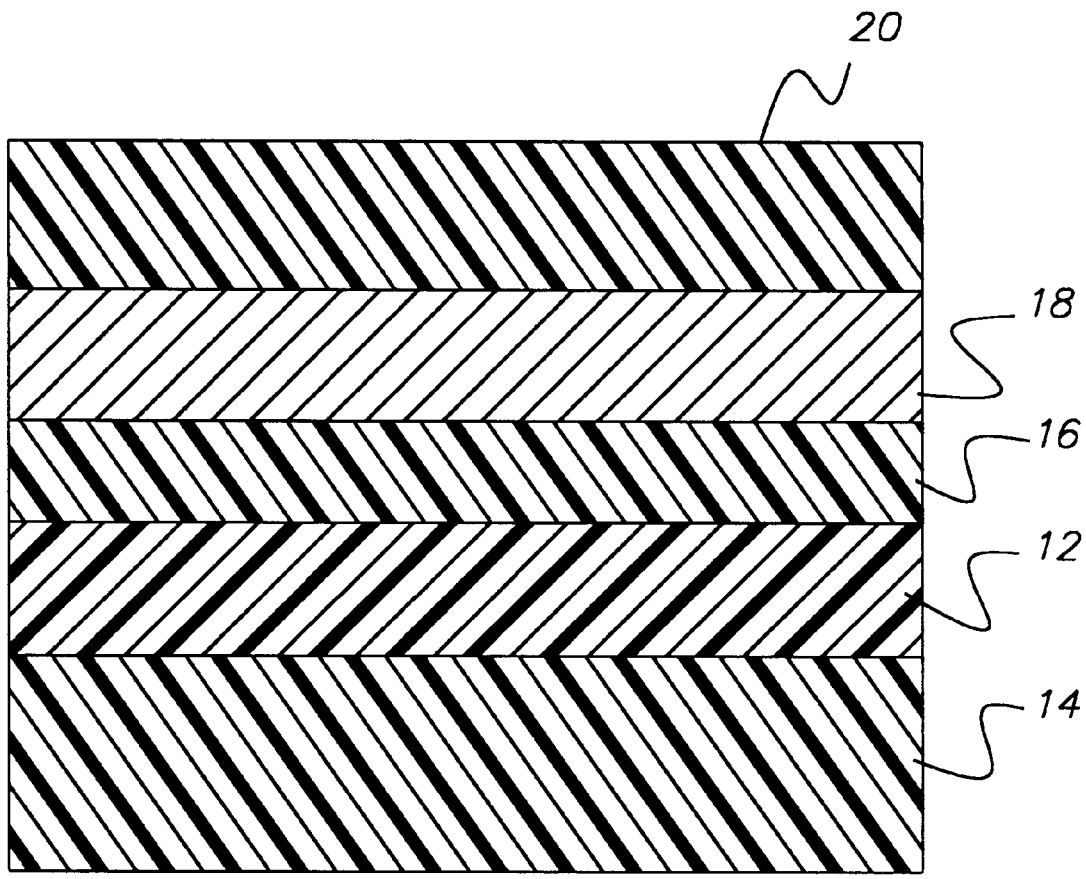
FIG. 1 is a cross-sectional view of an optical recording medium such as a WORM disk which depicts the present invention.

Turning first to FIG. 1 where a WORM recording medium 10 is constructed having a layer 12 formed of a phase-change material that can be cycled between the amorphous state and the crystalline state by the application of a laser beam. The WORM recording medium 10 construction includes a transparent substrate 14, the phase-change layer 12 deposited onto and in intimate contact with the transparent substrate 14, a dielectric layer 16, a metal reflector layer 18 and optionally a protective layer 20. Although it is preferable that the phase-change layer 12 be formed directly on the transparent substrate 14 it will be understood that an intermediate layer (not shown) may be provided between the phase-change layer 12 and the transparent substrate 14. The transparent substrate 14 can take a number of forms a transparent polycarbonate structure is preferable. The dielectric layer 16 can also take a number of different forms such as SiN, A/N, ZnS—SiO$_2$ mixture. The metal reflector layer 18 can be formed of gold, aluminum, silver or alloys thereof. The phase-change layer 12 materials may include an alloy of SbTe and Ge or an alloy of SbTeIn and Ag. Moreover, the phase-change material in the phase-change layer 12 can also be in accordance with the formula $(Sb_{1-x}Te_x)_{1-y}M_y$ wherein M is one or more elements selected from the list of Au, Ag, Cu, Al, Ga, In, Si, Ge, Sn, and Pb, $y \leq 0.2$, $0.1 \leq x \leq 0.4$.

It has been found that the phase-change layer 12 should be selected to have a thickness less than 20 nm but preferably less than 12 nm. With the selected thickness, the degradation in jitter upon second and further writing on the media become substantial such that it becomes unmistakenly clear that the data have been altered.

Figure 2A:
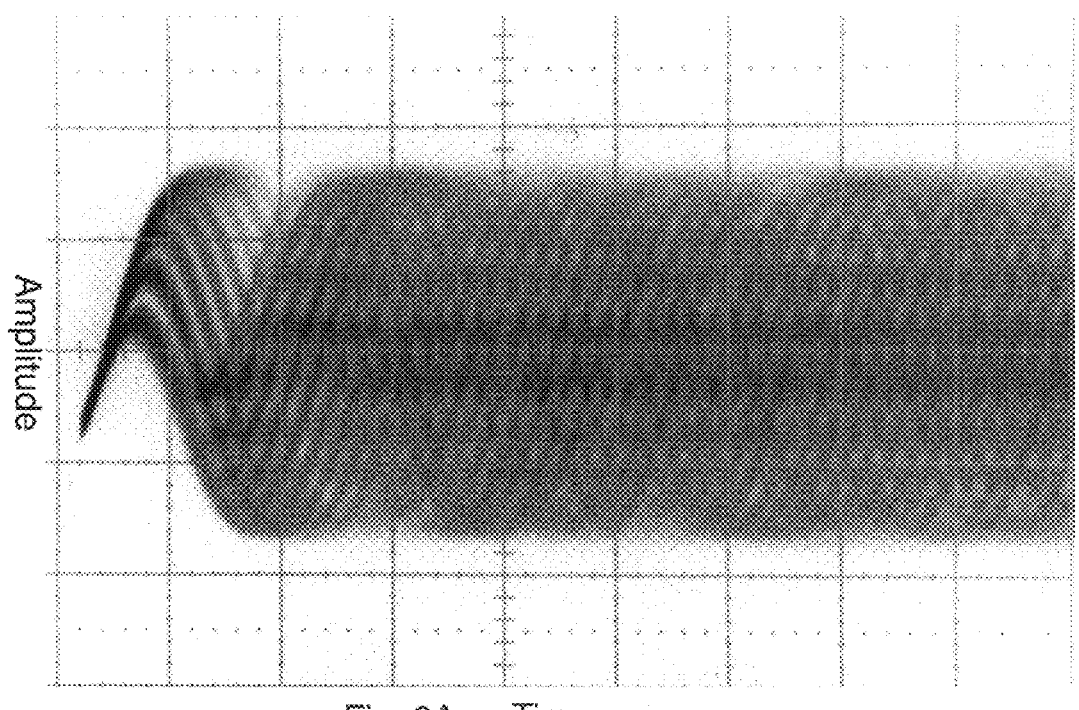
FIGS. 2a and 2b illustrate eye patterns of the read back data from the first write and second write, respectively, from an optical recording medium according to the present invention.
Figure 2B:
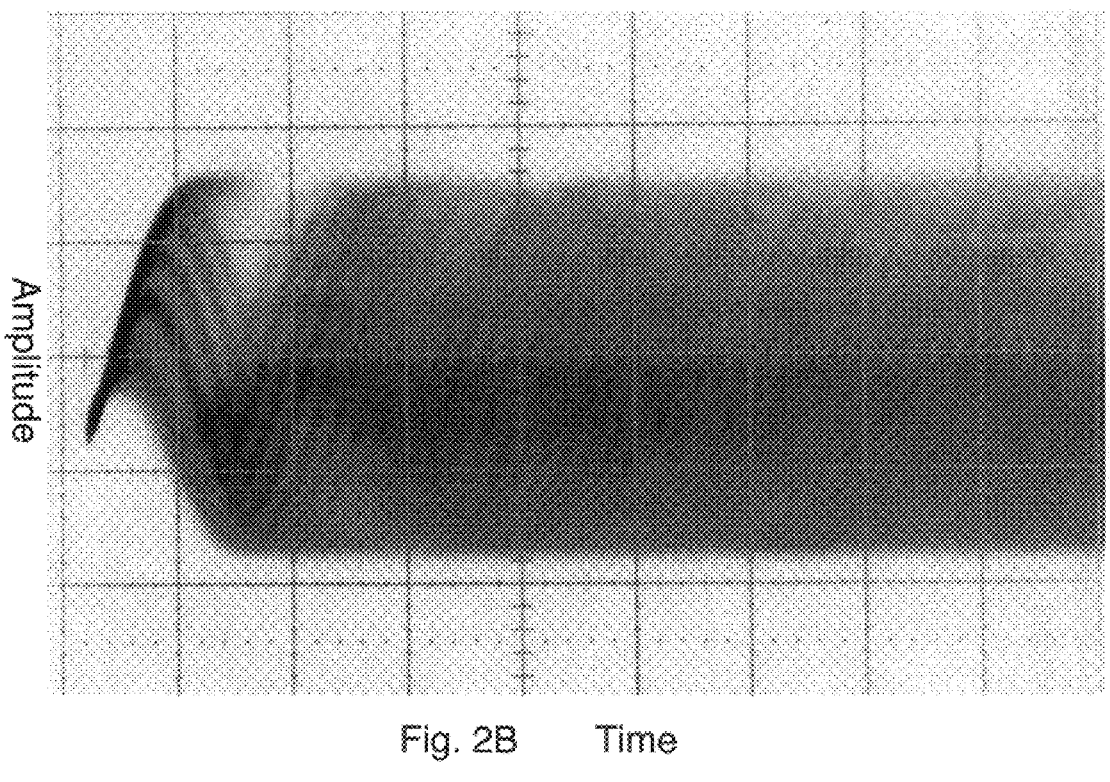

FIG. 2a illustrates eye-pattern of the read back signal from a well-written disk. The eye patterns are used by those skilled in the art to judge the quality of the read back signal. An eye pattern such as the one in FIG. 2a with clearly separated line-crossings indicates good signal that enables high fidelity read back of the recorded data. FIG. 2b, on the other hand, demonstrates degraded eye pattern that leads to difficulty in reading back the recorded data.

Figure 3A:
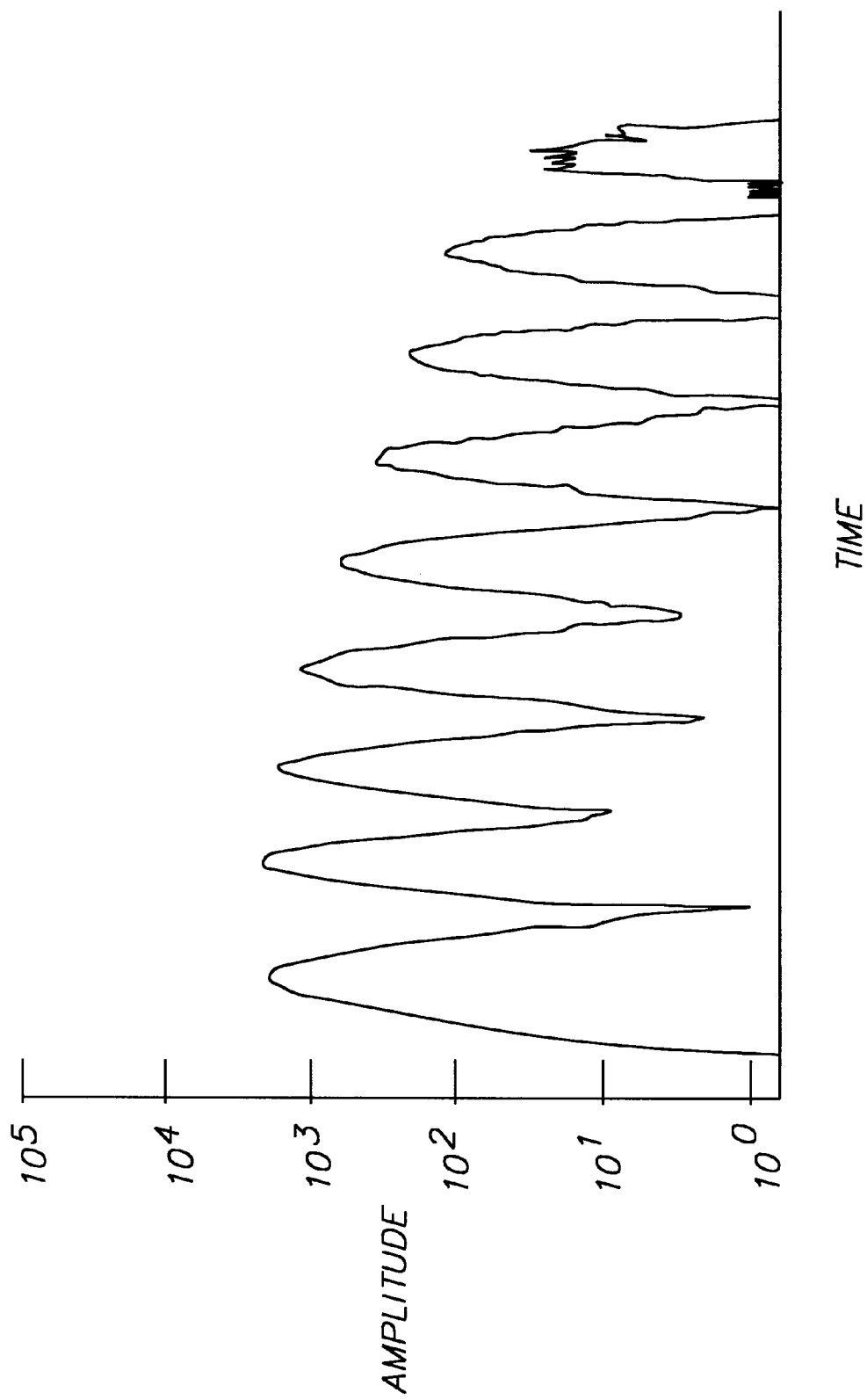
FIGS. 3a and 3b illustrate TIA spectra of the read back data from the first write and second write, respectively, from an optical recording medium according to the present invention.
Figure 3B:
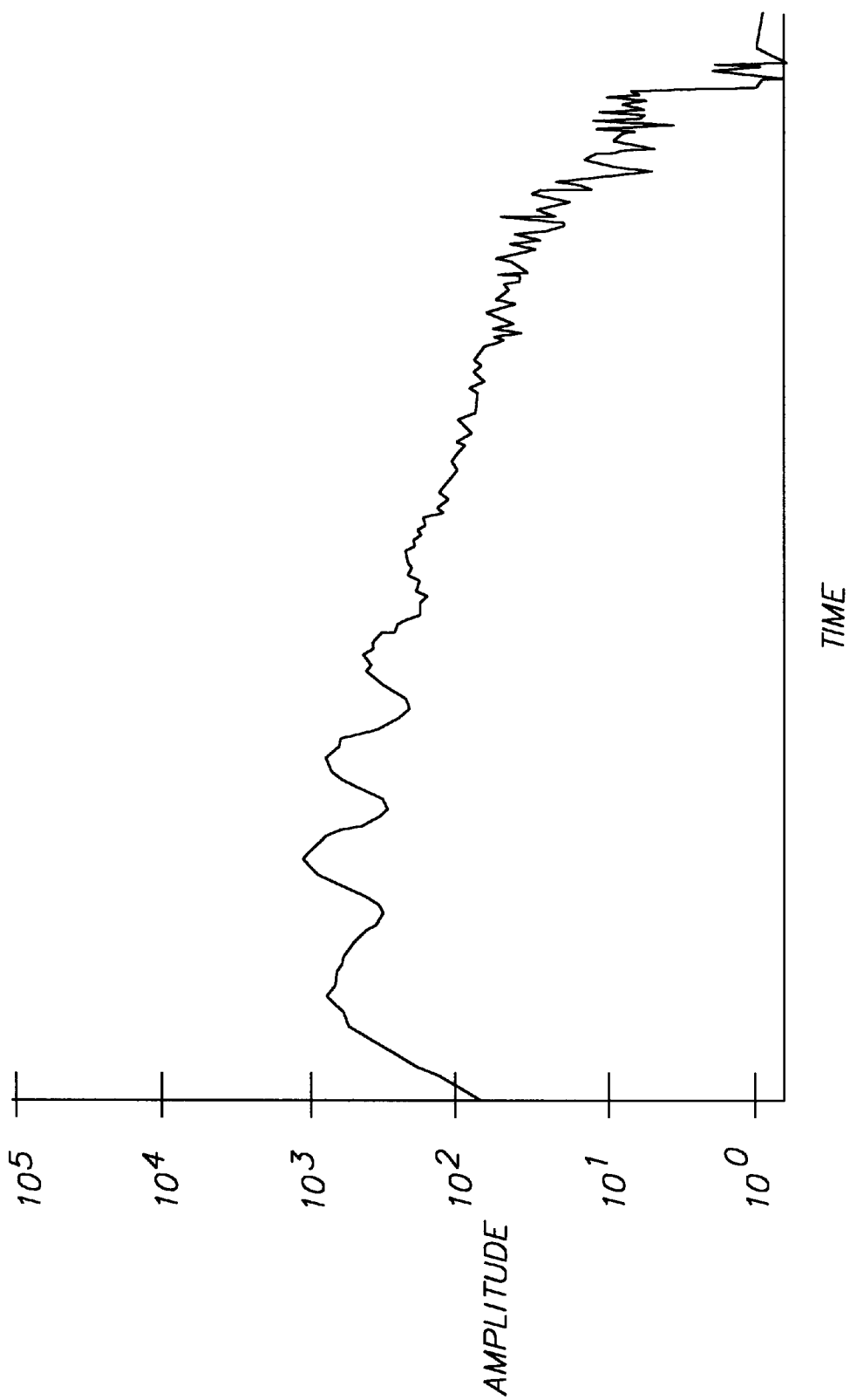

FIG. 3a illustrates Time-Interval-Analysis (TIA) spectrum of the read back signal from a well-written disk. TIA spectra are used by those skilled in the art to judge the quality of the read back signal. A TIA spectrum with well separated peaks, such as the one illustrated in FIG. 3a, indicates good signal that enables high fidelity read back of the recorded data. FIG. 3b, on the other hand, illustrates a degraded TIA spectrum. The peaks become indistinguishable from each other and the decoding the data becomes difficult.

The following examples explains the details of the present invention.

EXAMPLE 1

A disk-shaped WORM medium was fabricated using the $Sb_{0.68}Te_{0.32}$ alloy thin-film as the phase-change layer. The 9.4 nm thin-film layer was sputter-deposited onto the grooved surface a 0.6 mm polycarbonate substrate using a target of the same composition as the thin-film. The grooves on the substrate were provided to guide the laser beam during the recording and play back process. A 35 nm dielectric layer with a composition of $(ZnS)0.9(SiO_2)$ was then RF-sputter deposited onto the phase-change layer, this was then followed by a 100 nm reflector layer made of Al-2% Cr alloy. A ~5 μm thick UV polymer layer was then applied to the surface of the Al-2% Cr layer.

The disk was then initialized by using a 20 μm diameter Ar laser beam to scan over the surface of the disk to cause the phase-change layer to crystallize over the majority area of the disk.

The recording performance was carried out using a laser beam recorder having a optical head with 635 nm wavelength laser and a 0.6 NA objective lens. With the disk spinning at 3.5 m/s linear velocity a random Eight-out-of-Fourteen (EFM) data pattern was recorded using a pulsed laser train. Reading back the recorded data using the same optical head, the date-to-clock jitter was measured to be 3.72 ns. The eye pattern of the read back signal as illustrated in FIG. 2a is very clean and the time-interval-analyzer data in FIG. 3a indicate clearly discernable peaks. All these data demonstrate that the recorded data can be read back with good fidelity.

An overwrite experiment was then carried out where another eight out of fourteen modulation (EFM) pattern was rewritten over the previous data. Attempts to read back the new data now became very difficult. The data-to-clock jitter increased to about 7.95 ns, the eye pattern became washed out (FIG. 2b), and the time-interval-analyzer could no longer discern the data peaks (FIG. 3b). This disk clearly behaved like a WORM disk. Any attempts to rewrite data on this disk could not be carried out without leaving a detectable trace.

EXAMPLE 2

A series of disks were fabricated as described in Example 1 except the thickness of the phase-change layer was varied from 7.7 nm to 11.9 nm. Recording and rewriting experiments were carried out as described in Example 1. Table 1 below summarizes the data.

TABLE 1

Data-to-clock Jitter Data for Initial-Write and Over-Write For Disks of Various Phase-Change Layer Thickness

| Disk Number | Phase-change Thickness, nm | Data-to-Clock Jitter First-Write, ns | Data-to-Clock Jitter Rewritten, ns |
|---|---|---|---|
| 1 | 7.7 | 3.66 | 10.68 |
| 2 | 8.5 | 3.64 | 8.62 |
| 3 | 9.4 | 3.72 | 7.95 |
| 4 | 10.2 | 3.88 | 6.84 |
| 5 | 11.1 | 4.36 | 6.22 |
| 6 | 11.9 | 4.46 | 5.37 |

The disk described in Example one is included in this table.

It can be observed from Table 1 that for all these disks, the data degraded when over-write was performed. The amount of degradation, however, depends strongly on the thickness of the phase-change layers. For the materials used in the experiment, only those with phase-change layer thickness less than about 12 nm show a degradation of 50% in data-to-clock jitter to guarantee a non-mistakable signal of attempted overwrite.

The invention has been described in detail with particular reference to certain preferred embodiments thereof, but it will be understood that variations and modifications can be effected within the spirit and scope of the invention.

PARTS LIST

| | |
|---|---|
| 10 | recording medium |
| 12 | phase-change layer |
| 14 | substrate |
| 16 | dielectric layer |
| 18 | metal reflector layer |
| 20 | protective layer |

What is claimed is:

1. A recording medium comprising:

(a) a transparent substrate;

(b) a crystalline phase-change layer in intimate contact with the substrate;

(c) a dielectric layer provided over the phase-change layer;

(d) a metallic reflector layer provided over the dielectric layer; and (e) the crystalline phase-change layer having a thickness and phase-change material selected so that data can be recorded in it on a first write, but on second or subsequent writes the written data results in at least a 50% increase in data jitter.

2. A recording medium as set forth in claim 1 wherein the thickness of the phase-change layer is less than 20 nm.

3. A recording medium as set forth in claim 1 wherein the phase-change layer includes material give by the formula $(Sb_{1-x}Te_x)_{1-y}M_y$, wherein M is one or more elements selected from the list of Au, Ag, Cu, Al, Ga, In, Si, Ge, Sn, and Pb, $y \leq 0.2$, $0.1 \leq x \leq 0.4$.

4. A recording medium as set forth in claim 1 wherein the phase-change materials comprises an alloy including Sb, Te, and Ge.

5. A recording medium as set forth in claim 1 wherein the phase-change layer comprises an alloy including Sb, Te, In, and Ag.

* * * * *